United States Patent
Cunningham (10) Patent No.: US 8,559,532 B2
(45) Date of Patent: Oct. 15, 2013

(54) METHOD AND SYSTEM FOR DETECTING NON-LINEAR DEVICES

(75) Inventor: Christopher Cunningham, Belmont, MA (US)

(73) Assignee: AWARE, Inc., Bedford, MA (US)

( * ) Notice: Subject to any disclaimer, the term of this patent is extended or adjusted under 35 U.S.C. 154(b) by 310 days.

(21) Appl. No.: 12/864,526

(22) PCT Filed: Jan. 26, 2009

(86) PCT No.: PCT/US2009/032020
§ 371 (c)(1), (2), (4) Date: Sep. 15, 2010

(87) PCT Pub. No.: WO2009/097243
PCT Pub. Date: Aug. 6, 2009

(65) Prior Publication Data
US 2011/0053528 A1    Mar. 3, 2011

Related U.S. Application Data

(60) Provisional application No. 61/062,805, filed on Jan. 29, 2008.

(51) Int. Cl.
*H04B 3/00* (2006.01)
*H04L 25/00* (2006.01)

(52) U.S. Cl.
USPC .......... 375/257; 375/219; 375/220; 375/221; 375/222; 370/286; 370/292; 370/290; 370/291; 379/406.12; 379/406.13; 379/406.14

(58) Field of Classification Search
USPC .................. 375/346, 285, 350, 229, 231; 379/406.1, 406.01, 406.12–406.14; 370/286, 292, 290, 291
See application file for complete search history.

(56) References Cited

U.S. PATENT DOCUMENTS 5,475,315 A    12/1995    Cabot
6,111,936 A    8/2000    Bremer
(Continued)

FOREIGN PATENT DOCUMENTS

AU    2003-262111    1/2004
JP    A-Hei 04-175037    6/1992
(Continued)

OTHER PUBLICATIONS

T1-413-1998 "Network and Customer Installation Interfaces—Asymmetric Digital Subscriber Line (ADSL) Metallic Interface" Draft American National Standards for Telecommunications, 1998, i.e., T1.413 Issue 2, 270 pages.
(Continued)

*Primary Examiner* — Phuong Phu
(74) *Attorney, Agent, or Firm* — Jason H. Vick; Sheridan Ross, PC (57) ABSTRACT

To assist with the detection of unfiltered device(s), a system observes how the received noise changes between two links as the transmit signal is changed. Harmful unfiltered nonlinear devices will generate significant noise that depends on the transmitted signals; therefore, this additional noise can be quantified to some extent by comparing the observed noise for two different transmit signals. The total noise can be determined from the SNR if the received signal is known. The received signal may be read directly in some non-standard systems, or it may be determined from the known transmit signal and channel attenuation, which is sometimes the case in standard-compliant links, but often with a relatively large error. To circumvent this problem, certain embodiments of this invention only consider the change in noise between two links with the same channel attenuation. This differential comparison makes it unnecessary to accurately know the channel attenuation.

24 Claims, 5 Drawing Sheets

(56) References Cited

U.S. PATENT DOCUMENTS

| | | | |
|---|---|---|---|
| 6,192,109 B1 | 2/2001 | Amrany et al. | |
| 6,219,378 B1* | 4/2001 | Wu | 375/231 |
| 6,438,212 B1 | 8/2002 | Lysaght et al. | |
| 6,456,650 B1 | 9/2002 | Cheng et al. | |
| 6,466,649 B1 | 10/2002 | Walance et al. | |
| 6,487,243 B1 | 11/2002 | Hwang et al. | |
| 6,535,580 B1 | 3/2003 | Strauss et al. | |
| 6,658,052 B2 | 12/2003 | Krinsky et al. | |
| 6,748,016 B1 | 6/2004 | Tzannes | |
| 6,856,683 B1 | 2/2005 | Murphy et al. | |
| 7,177,419 B2* | 2/2007 | Sedarat et al. | 379/406.1 |
| 7,580,471 B2 | 8/2009 | Cunningham | |
| 2001/0031048 A1 | 10/2001 | Payne et al. | |
| 2002/0114383 A1 | 8/2002 | Belge et al. | |
| 2005/0041753 A1* | 2/2005 | Cunningham | 375/285 |
| 2006/0062379 A1 | 3/2006 | Sedarat et al. | |
| 2006/0098725 A1 | 5/2006 | Rhee et al. | |
| 2009/0268797 A1 | 10/2009 | Cunningham | |

FOREIGN PATENT DOCUMENTS

| | | |
|---|---|---|
| JP | A-Hei 04-181852 | 6/1992 |
| JP | A-Hei 10-500540 | 1/1998 |
| JP | A-2001-519620 | 10/2001 |
| WO | WO 95/26604 | 10/1995 |
| WO | WO 99/18701 | 4/1999 |
| WO | WO 00/63709 | 10/2000 |
| WO | WO 2009/097243 | 8/2009 |

OTHER PUBLICATIONS

ITU-T Recommendation G.992.1 "Series G: Transmission Systems and Media, Digital Systems and Networks—Asymmetric Digital Subscriber Line (ADSL) Transceivers" Jun. 1999, 256 pages.

ITU-T Recommendation G.9960 "Series G: Transmission Systems and Medial, Digital Systems and Networks—Unified High-Speed Wire-Line Based Home Networking Transceivers—System Architecture and Physical Layer Specification" Jun. 2010, 162 pages.

International Telecommunication Union, Recommendation G.997.1, Series G: Transmission Systems and Media, Digital Systems and Networks, Apr. 2009, 128 pages.

U.S. Appl. No. 13/502,199, filed Apr. 16, 2012, Cunningham et al.

"IEEE Standard 802.11: Part 11: Wireless LAN Medium Access Control (MAC) and Physical Layer (PHY) Specifications," IEEE Standard 802.11-2007, Nov. 30, 2007, pp. 1-1233.

"IEEE Standard 802.3: Part 3: Carrier Sense Multiple Access with Collision Detection (CSMA/CD) Access Method and Physical Layer Specifications" IEEE Standard 802.3-2008, Dec. 26, 2008, pp. 1-2977.

International Search Report for International Application No. PCT/US2010/058292, mailed Mar. 29, 2011.

Written Opinion for International Application No. PCT/US2010/058292, mailed Mar. 29, 2011.

Communication Pursuant to Rules 161(1) and 162 EPC for European Patent Application No. 09706491.9, mailed Nov. 12, 2010.

International Preliminary Report on Patentability for International Application No. PCT/US2010/058292, mailed Jun. 14, 2012.

Communication Pursuant to Rules 161(1) and 162 EPC for European Patent Application No. 10791017.6, mailed Jul. 27, 2012.

ITU-T Recommendation G.993.2, "Very high speed digital subscriber line transceivers 2 (VDSL2)," International Telecommunications Union, Feb. 2006, 252 pages.

ITU-T Recommendation G.992.3, "Asymmetric digital subscriber line transceivers 2 (ADSL2)," Jan. 2005, 436 pages.

ITU-T Recommendation G.992.5, "Asymmetric Digital Subscriber Line (ADSL) transceivers—Extended bandwidth ADSL2 (ADSL2+)," International Telecommunications Union, May 2003, 92 pages.

International Search Report for International (PCT) Patent Application No. PCT/US2009/032020, mailed Apr. 27, 2009.

Written Opinion for International (PCT) Patent Application No. PCT/US2009/032020, mailed Apr. 27, 2009.

International Preliminary Report on Patentability for International (PCT) Patent Application No. PCT/US2009/032020, mailed Aug. 12, 2010.

Cunningham et al. "Proposal for a Standard R-Lineprobe State for G.992.3", Aug. 21, 2003.

International Search Report for International (PCT) Patent Application No. PCT/US2004/026912, mailed Dec. 9, 2004.

Written Opinion for International (PCT) Patent Application No. PCT/US2004/026912, mailed Dec. 9, 2004.

International Preliminary Report on Patentabilitiy for International (PCT) Patent Application No. PCT/US2004/026912, mailed Mar. 2, 2006.

First Examination Report for Australian Patent Application No. 2004302784, dated Jun. 2, 2009.

Notice of Acceptance for Australian Patent Application No. 2004302784, dated Oct. 15, 2009.

First Examination Report for Australian Patent Application No. 2010200127, mailed Mar. 6, 2012.

First Office Action for Chinese Patent Application No. 200480027933.4, mailed Nov. 28, 2008.

Second Office Action (including translation) for Chinese Patent Application No. 200480027933.4, mailed May 22, 2009.

First Examination Report for Indian Patent Application No. 549/KOLNP/2006, dated Sep. 27, 2007.

Office Action for European Patent Application No. 04781572.5, dated Dec. 14, 2007.

Notification of Reasons for Refusal (including translation) for Japanese Patent Application No. 2006-524035, dispatched Mar. 16, 2009.

Office Action for Canadian Patent Application No. 2,535,460, mailed Dec. 1, 2011.

Third Office Action (including translation) for Chinese Patent Application No. 200480027933.4, mailed Nov. 20, 2009.

Notification of Granting a Patent for Chinese Patent Application No. 200480027933.4, mailed Jan. 26, 2011.

Office Action for European Patent Application No. 04781572.5, dated Jan. 28, 2010.

Official Action for European Patent Application No. 04781572.5, dated Aug. 26, 2011.

Partial European Search Report for European Patent Application No. 10012113.6, dated Sep. 6, 2011.

Extended European Search Report for European Patent Application No. 10012113.6, dated Nov. 30, 2011.

Notification of Reasons for Refusal (including translation) for Japanese Patent Application No. 2006-524035, dispatched Jan. 18, 2010.

Notice of Allowance for Japanese Patent Application No. 2006-524035, mailed Aug. 30, 2010.

Official Action (including translation) for Korean Patent Application No. 10-2006-7003404, mailed Jan. 12, 2011.

Notice of Refusal for Korean Patent Application No. 10-2006-7003404, mailed Jul. 29, 2011.

Official Action (including translation) for Korean Patent Application No. 10-2009-7016184, dispatched Feb. 26, 2010.

Official Action (including translation) for Korean Patent Application No. 10-2009-7016184, mailed Dec. 28, 2010.

Notice of Allowance (including translation) for Korean Patent Application No. 10-2009-7016184, mailed Jul. 1, 2011.

Official Action for U.S. Appl. No. 10/921,857, mailed Dec. 11, 2007.

Official Action for U.S. Appl. No. 10/921,857, mailed Sep. 22, 2008.

Official Action for U.S. Appl. No. 10/921,857, mailed Dec. 24, 2008.

Notice of Allowance for U.S. Appl. No. 10/921,857, mailed Jun. 30, 2009.

(56) References Cited

OTHER PUBLICATIONS

Supplemental Notice of Allowance for U.S. Appl. No. 10/921,857, mailed Jul. 23, 2009.
Official Action for U.S. Appl. No. 12/498,155, mailed Aug. 6, 2010.
Notice of Acceptance for Australian Patent Application No. 2010200127, dated Dec. 7, 2012.
First Official Action (including translation) for Japanese Patent Application No. 2009-214695, mailed Sep. 3, 2012.
Decision of Refusal (including translation) for Japanese Patent Application No. 2009-214695, mailed Mar. 11, 2013.
Notice of Allowance for Canadian Patent Application No. 2,535,460, mailed Jan. 25, 2013.

* cited by examiner

METHOD AND SYSTEM FOR DETECTING NON-LINEAR DEVICES

CROSS REFERENCE TO RELATED APPLICATION

This application is a national stage application under 35 U.S.C. 371 of PCT Application No. PCT/US2009/032020 having an international filing date of Jan. 26, 2009, which designated the United States, which PCT application claimed the benefit of U.S. application Ser. No. 61/062,805, filed Jan. 29, 2008, the entire disclosure of each is hereby incorporated herein by reference in their entirety.

RELATED APPLICATION DATA

This application claims the benefit of and priority under 35 U.S.C. §119(e) to U.S. Patent Application No. 61/062,805, filed Jan. 29, 2008, entitled "Method and System for Detecting Unfiltered Devices Affecting DSL Service," which is incorporated herein by reference in its entirety.

BACKGROUND

Field of the Invention

Exemplary aspects of the invention relate to communications systems. More specifically, exemplary aspects of the invention relate to communications systems and nonlinear device detection that affects DSL communications. These exemplary aspects can be directed toward xDSL-type communications systems as well as packet-based systems, powerline communications systems, coaxial-based communications systems, home networking systems and the like.

SUMMARY

One of the most problematic aspects of Digital Subscriber Line (DSL) communications is the in-home environment. One of the most troubling aspects of the in-home environment is the presence of unfiltered devices connected to the telephone line such as telephones, answering machines and fax machines. Many of these devices impose nonlinear behavior on transmitted signals. Harmonic frequencies arising from these nonlinearities generate a disturbance(s) that is often the dominant noise source limiting data rates and loop reach of DSL systems.

Devices that either directly or indirectly impose nonlinear effects on communication signals will be referred to as nonlinear devices. A device can impose nonlinear behavior on a communication signal in one of many ways. For example, the nonlinear device could receive a communication signal and then actively transmit a nonlinearly distorted version of either the communication signal or its own signal back onto the line where it interferes with the original communication signal. This occurs, for example, when the components in a telephone are forced outside of their linear operating range by, for example, a DSL signal. A nonlinear device could also change the output impedance of a communications channel causing an impedance mismatch at the communications channel interface. This consequently could increase the amount of echo at the interface and drive the front-end of the communications device outside of its own linear operating range One purpose of certain exemplary embodiments of this invention is to detect nonlinear devices that affect DSL communications, and upon their detection, generate, for example, a message that recommends corrective action such as the insertion of a micro-filter between the nonlinear device and the communications channel.

Exemplary, non-limiting aspects of the invention include the following:

1. A module capable of detecting the presence of a nonlinear device by comparing at least one first noise value to at least one second noise value, wherein the first noise value is from a first link having a first transmit power level and the second noise value is from a second link having a second different transmit power level.

2. A method of detecting the presence of a nonlinear device comprising:
comparing at least one first noise value to at least one second noise value, wherein the first noise value is from a first link having a first transmit power level and the second noise value is from a second link having a second different transmit power level.

3. A module capable of detecting the presence of a nonlinear device comprising:
means for comparing at least one first noise value to at least one second noise value, wherein the first noise value is from a first link having a first transmit power level and the second noise value is from a second link having a second different transmit power level.

4. An information storage media comprising information that when executed compares at least one first noise value to at least one second noise value, wherein the first noise value is from a first link having a first transmit power level and the second noise value is from a second link having a second different transmit power level.

5. Any one of aspects 1-4, wherein the first transmit power level is for at least one subcarrier in the first link and the second transmit power level is different, and for the at least one subcarrier in the second link.

6. Any one of aspects 1-4, wherein the first noise value corresponds to a noise measurement on at least one subcarrier.

7. Any one of aspects 1-4, wherein the second noise value corresponds to a noise measurement on at least one subcarrier.

8. Any one of aspects 1-4, wherein the first noise value and the second noise value correspond to a noise measurement on at least one subcarrier.

9. A module capable of detecting the presence of a nonlinear device by comparing at least one first parameter value to at least one second parameter value, wherein the first parameter value is from a first link having a first transmit power level and the second parameter value is from a second link having a second different transmit power level.

10. A method of detecting the presence of a nonlinear device comprising:
comparing at least one first parameter value to at least one second parameter value, wherein the first parameter value is from a first link having a first transmit power level and the second parameter value is from a second link having a second different transmit power level.

11. A module capable of detecting the presence of a nonlinear device comprising:
means for comparing at least one first parameter value to at least one second parameter value, wherein the first parameter value is from a first link having a first transmit power level and the second parameter value is from a second link having a second different transmit power level.

12. A computer-readable storage media having stored thereon processer executable instructions that when executed compares at least one first parameter value to at least one second parameter value, wherein the first parameter value is from a first link having a first transmit power level and the second parameter value is from a second link having a second different transmit power level.

13. Any one of aspects 9-12, wherein the first transmit power level is for at least one subcarrier in the first link and the second transmit power level is different, and for the at least one subcarrier in the second link.

14. Any one of aspects 9-12, wherein the first parameter value corresponds to at least one of a noise measurement or an SNR measurement on at least one subcarrier.

15. Any one of aspects 9-12, wherein the second parameter value corresponds to at least one of a noise measurement or an SNR measurement on at least one subcarrier.

16. Any one of aspects 9-12, wherein the first parameter value and the second parameter value correspond to at least one of a noise measurement or an SNR measurement on at least one subcarrier.

17. Any of the above aspects above wherein a user is notified of the detection of a non-linear device.

18. Any of the above aspects above wherein additional links are performed to identify additional non-linear devices.

Packet-based communication networks, such as in-home packet based networks, the newly consented ITU G.hn Recommendation, Powerline networks (e.g. Homeplug), phoneline networks (e.g., HPNA) and coax networks (e.g., MOCA) have similar problems with non-linear device interference. Many of these devices impose nonlinear behavior on transmitted signals. Harmonic frequencies arising from these nonlinearities generate a disturbance(s) that is often the dominant noise source limiting data rates and coverage in these networks.

Another purpose of certain exemplary embodiments of this invention is to detect nonlinear devices that affect in-home networks, and upon their detection, generate, for example, a message that recommends corrective action such as the insertion of a micro-filter between the nonlinear device and the communications channel, remove the non-linear device from the network or move the non-linear device to a different network in the home.

Exemplary, non-limiting aspects of the invention also include the following:

1. A module capable of detecting the presence of a nonlinear device by comparing at least one first noise value to at least one second noise value, wherein the first noise value is from a first packet transmission having a first transmit power level and the second noise value is from a second packet transmission having a second different transmit power level.

2. A method of detecting the presence of a nonlinear device comprising:
comparing at least one first noise value to at least one second noise value, wherein the first noise value is from a first packet transmission having a first transmit power level and the second noise value is from a second packet transmission having a second different transmit power level.

3. A module capable of detecting the presence of a nonlinear device comprising:
means for comparing at least one first noise value to at least one second noise value, wherein the first noise value is from a first packet transmission having a first transmit power level and the second noise value is from a second packet transmission having a second different transmit power level.

4. An information storage media comprising information that when executed compares at least one first noise value to at least one second noise value, wherein the first noise value is from a first packet transmission having a first transmit power level and the second noise value is from a second packet transmission having a second different transmit power level.

5. Any one of aspects 1-4, wherein the first transmit power level is for at least one subcarrier in the first packet transmission and the second transmit power level is different, and for the at least one subcarrier in the second packet transmission.

6. Any one of aspects 1-4, wherein the first noise value corresponds to a noise measurement on at least one subcarrier.

7. Any one of aspects 1-4, wherein the second noise value corresponds to a noise measurement on at least one subcarrier.

8. Any one of aspects 1-4, wherein the first noise value and the second noise value correspond to a noise measurement on at least one subcarrier.

9. A module capable of detecting the presence of a nonlinear device by comparing at least one first parameter value to at least one second parameter value, wherein
the first parameter value is from a first packet transmission having a first transmit power level and the second parameter value is from a second packet transmission having a second different transmit power level.

10. A method of detecting the presence of a nonlinear device comprising:
comparing at least one first parameter value to at least one second parameter value, wherein the first parameter value is from a first packet transmission having a first transmit power level and the second parameter value is from a second packet transmission having a second different transmit power level.

11. A module capable of detecting the presence of a nonlinear device comprising:
means for comparing at least one first parameter value to at least one second parameter value, wherein the first parameter value is from a first packet transmission having a first transmit power level and the second parameter value is from a second packet transmission having a second different transmit power level.

12. A computer-readable storage media having stored thereon processer executable instructions that when executed compares at least one first parameter value to at least one second parameter value, wherein the first parameter value is from a first packet transmission having a first transmit power level and the second parameter value is from a second packet transmission having a second different transmit power level.

13. Any one of aspects 9-12, wherein the first transmit power level is for at least one subcarrier in the first packet transmission and the second transmit power level is different, and for the at least one subcarrier in the second packet transmission.

14. Any one of aspects 9-12, wherein the first parameter value corresponds to at least one of a noise measurement or an SNR measurement on at least one subcarrier.

15. Any one of aspects 9-12, wherein the second parameter value corresponds to at least one of a noise measurement or an SNR measurement on at least one subcarrier.

16. Any one of aspects 9-12, wherein the first parameter value and the second parameter value correspond to at least one of a noise measurement or an SNR measurement on at least one subcarrier.

17. Any of the above aspects above wherein a user is notified of the detection of a non-linear device.

18. Any of the above aspects above wherein additional packet transmissions are performed to identify additional non-linear devices.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures wherein.

DETAILED DESCRIPTION

The exemplary embodiments of this invention will be described in relation to nonlinear device detection and effect mitigation in an xDSL environment. However, it should be appreciated, that in general, the systems and methods of this invention will work equally well for any type of communication system in any environment.

The exemplary systems and methods of this invention will also be described in relation to multicarrier modems, such as xDSL modems and VDSL modems, and associated communication hardware, software and communication channels. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as a modem, linecard, or collocated on a particular node of a distributed network, such as a telecommunications network. As will be appreciated from the following description, and for reasons of computational efficiency, the components of the system can be arranged at any location within a distributed network without affecting the operation of the system. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the system could be distributed between a modem and an associated computing device.

Furthermore, it should be appreciated that the various links, including communications channel, connecting the elements (not shown) can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. Transmitting modem and transmitting transceiver as well as receiving modem and receiving transceiver are used interchangeably herein.

Moreover, while some of the exemplary embodiments described herein are directed toward a transmitter portion of a transceiver performing certain functionality, this disclosure is intended to include corresponding receiver-side functionality in both the same transceiver and/or another transceiver.

Certain exemplary embodiments of this invention relate to multi-carrier communications links such as discrete multi-tone (DMT). The term link is used to describe the process of initializing two transceivers and entering into steady state data transmission mode. Also, the terms transceiver and modem have the same meaning and are used interchangeably and steady state data transmission mode is also referred to as "Showtime."

The exemplary method may use standard-compliant links (i.e., as specified in published DSL standards such as ITU-T G.992.3/5 and G.993.2, which are incorporated herein by reference in their entirety), but it is not restricted to standard compliant links. The individual carriers used for the link will be referred to as "subcarriers" or "subchannels". Generally, each link is full duplex, comprising both an upstream direction and a downstream direction. A Power Spectral Density (PSD) is transmitted in both directions. For standard compliant DSL as well as some nonstandard xDSL links, these PSDs are configurable, usually by adjusting subcarrier masks, PSD masks, nominal PSD levels, etc.

For standard compliant xDSL links (as well as some non-standard DSL links), it also is possible to observe the signal-to-noise ratios (SNRs) for each of the upstream and/or downstream subcarriers used for the link. For recent ITU DSL standards (ADSL2 and beyond), this can be accomplished if the link is performed in the Loop Diagnostics Mode as defined by ITU standards for DSL, or alternatively the SNRs can be read from the MIB by using a messaging channel during Showtime, which is term used to denote the steady-state data transmission mode for DSL. If SNRs are not available (such as with ITU G992.1 and T1.413 ADSL standards), then the bit allocations per subcarrier, fine gain allocations per subcarrier, and the average SNR margin may be used to estimate the SNR per subcarrier.

In the following description, the collective upstream and downstream PSDs that are transmitted for a particular link will be referred to as a PSD profile. The term monitoring subcarriers will be used to refer to the one or more subcarriers for which observations are recorded and used to determine whether an unfiltered nonlinear device is connected to the line. Note that the monitoring subcarriers may come from the upstream, the downstream, or both (whatever is observable).

One aspect of the exemplary method is to observe how the received noise changes between two links as the transmit signal is changed. Harmful unfiltered nonlinear devices will generate significant noise that depends on the transmitted signals; therefore, this additional noise can be quantified to some extent by comparing the observed noise for two different transmit signals.

The total noise can be determined from the SNR if the received signal is known. The received signal may be read directly in some non-standard systems, or it may be determined from the known transmit signal and channel attenuation, which is sometimes the case in standard-compliant links, but often with a relatively large error.

To circumvent this problem, certain embodiments of this invention only consider the change in noise between two links with the same channel attenuation. This differential comparison makes it unnecessary to accurately know the channel attenuation. Let the SNRs for links 1 and 2 be given by:

$$SNR1=S1/N1 \text{ and } SNR2=S2/N2,$$

respectively, where S1 and S2 are the transmitted signals and N1 and N2 are the received noises. If S1 and S2 are known, then $N1/N2=(S1*SNR2)/(S2*SNR1)$.

Note that the transmitted signals S1 and S2 must take into account any masks and/or gains that are included within the SNR calculation.

While some of the exemplary embodiments described herein compare measured noises for the two links (or packets) by explicitly formulating their relationship to one another numerically, it should be appreciated that this comparison could be implemented by using a machine learning technology that compares measured noises for the two links (or packets). The machine learning module could be trained with a set of data in which a variety of nonlinear devices are present under different line conditions, as well as different situations in which no nonlinear devices are present under different line conditions. The inputs to such a machine learning module could be any combination of parameters that are measured or derived, including transmitted signals, SNRs and noises.

Figure 1:
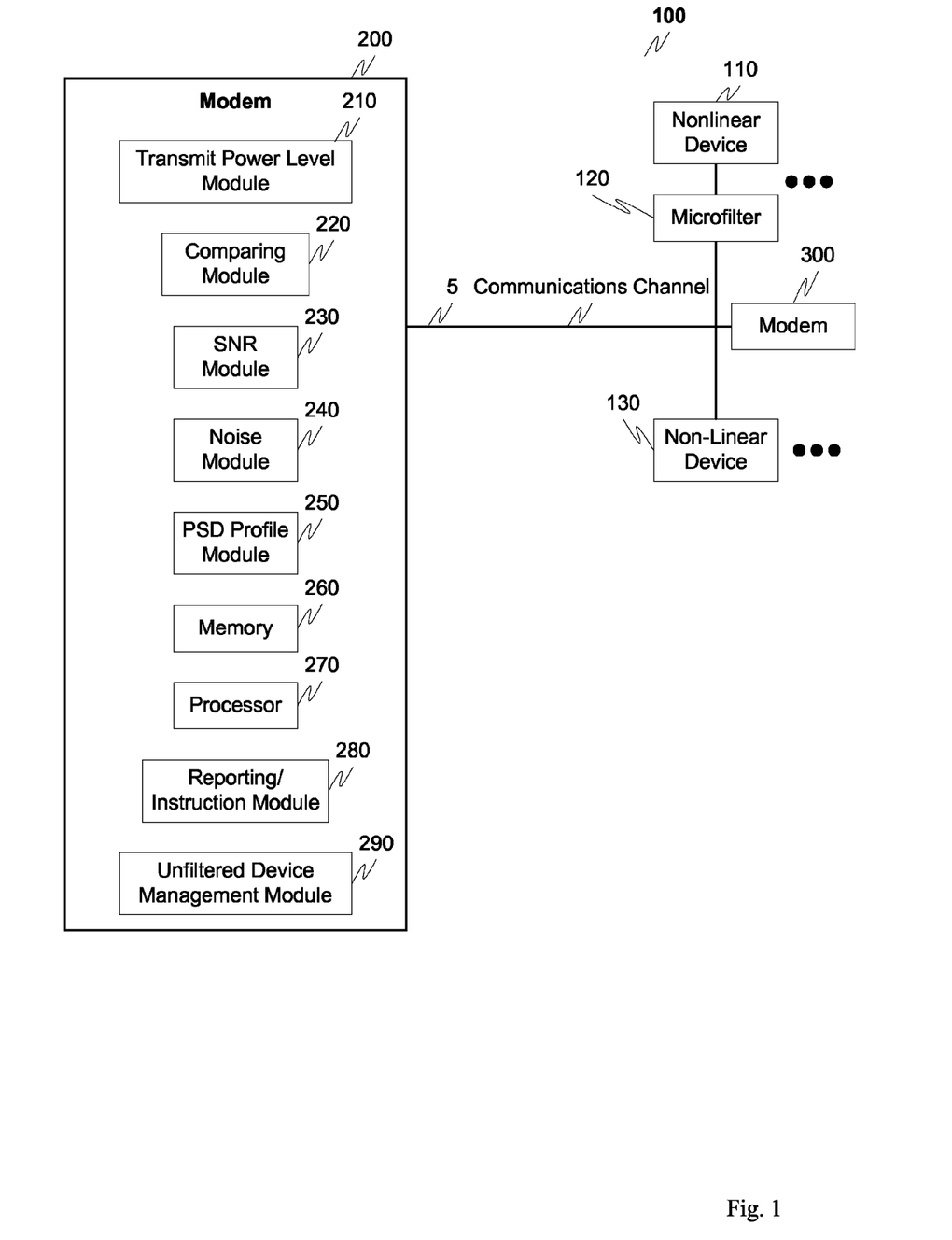
FIG. 1 illustrates an exemplary communication system according this invention.

FIG. 1 illustrates a communications system 100 that includes a modem 200, a nonlinear device 110, microfilter 120, modem 300 and nonlinear device 130 all connected by communications channel 5. The modem 200 comprises a transmit power level module 210, a comparing module 220, a SNR module 230, a noise module 240, a PSD profile module 250, memory 260, processor 270, a reporting/instruction module 280 and unfiltered device management module 290.

In operation, the modem 200, in cooperation with the unfiltered device management module 290, the PSD profile module and memory 260, initiates a link over the communications channel 5 with a particular PSD profile. The unfiltered device management module 290 waits for the link to succeed or fail.

If the SNR and transmit signal levels are observable, by the SNR module 230 and transmit power level module 210, respectively, only when a link is successful, then random environmental fluctuations (such as crosstalk, AM radio interference, etc.) may cause links to fail. If the link fails, it may be necessary to repeat the link attempt using the same PSD profile.

If SNR and transmit signal levels can be observed for each of the monitoring subcarriers for the link attempt in the previous step, the next process is skipped with operation continuing to the Link1 process.

If the SNR and transmit signal levels cannot be observed for each of the monitoring subcarriers for the link attempt in the previous step, then additional links may be attempted with alternative PSD profiles. Generally these alternative PSD profiles should be more robust against noise and/or unfiltered devices so that at least some information can be garnered. Later it will be described what it means for a PSD profile to be robust.

If alternate PSD profiles are available, and in conjunction with the PSD profile module 250, an alternate PSD profile is used. If no other PSD profiles are available, then it cannot be known whether a harmful unfiltered device is present. It may be the case that a harmful unfiltered device is present and is preventing all PSD profiles from linking, or it may be the case that some other type of impairment is present and is preventing all PSD profiles from linking. In this case, the reporting/instruction module 280 can create a report indicating that it is unknown whether an unfiltered device is present and skip the remaining steps. This report can then be forwarded to any appropriate destination.

Link1 Process

In the Link1 process, the SNR and transmit signal levels are stored with the cooperation of the memory 260, processor 270 and unfiltered device management module 290 as Link1 and then the signal-to-noise ratios SNR1 and transmit signal levels S1 for each of the monitoring subcarriers recorded for the link established in the above operation. The link setting used to obtain SNR1 and S1 will be denoted Link1.

If the link is successful, this usually will be possible. If the link fails, it sometimes might still be possible if special access is available to the information.

Also, if it is possible to determine the approximate line conditions from the available data (e.g., attenuation, loop length, noise levels), then those can optionally be recorded and stored as well to better assist with the following steps. If no other PSD profiles are available, then the operation continues to the second link process.

Otherwise, another link is initiated with a different PSD profile with the cooperation of the PSD profile module 250. The monitoring subcarriers used for Link1 should be included in this link attempt. All controllable link parameters except for those controlling the PSD profile should be set exactly the same for this link attempt as for Link1. If line conditions were recorded from Link1, then they can be used to help guide the choice of which PSD profile and monitoring subcarriers to choose for this link attempt. The unfiltered device management module 290 then waits for this link attempt to succeed or fail.

Again, to guard against random environmental fluctuations, it may be necessary to repeat this link attempt with the same PSD profile if the SNR and transmit signal levels are not observable upon failure.

If either SNR or transmit signal levels can be observed for each of the monitoring subcarriers for the link attempt in the previous step, then the rest of the process is skipped and operation continues to the recording process.

If SNR and transmit signal levels cannot be observed for each of the monitoring subcarriers for the link attempt in the previous step, then additional links may be attempted with alternative PSD profiles. Again, generally these alternative PSD profiles should be more robust against noise and/or unfiltered devices. If no other PSD profiles are available, then the operation continues to the second link process.

If alternate PSD profiles are available, an alternate PSD profile is used the process jumps back up to initiate another link with a different PSD profile.

Next, the signal-to-noise ratios SNR2 and transmit signal levels S2 for each of the monitoring subcarriers for the link established above are stored and recorded with the cooperation of the memory 260, SNR module 230 and transmit power level module 210. If the link is successful, this usually will be possible. If the link fails, it sometimes might still be possible if special access is available to the information.

The comparing module 220 in cooperation with the noise module 240, processor 270 and memory 260 then determine the noise change $N1/N2=(S1*SNR2)/(S2*SNR1)$ across the monitoring subcarriers. (Note that in some cases S1 will be the same as S2, which means that the reciprocal ratio of the SNRs can be used directly.)

Next, it is determined whether the noise change N1/N2 is reasonable. A noise change is reasonable if one of the noises is expected to be similar or significantly larger than the other, but it is observed to be significantly smaller.

If the noise change across the monitoring subcarriers is not reasonable, then something must have gone wrong with the experiment. In this case, no further steps are performed. The operation is then terminated and in conjunction with the reporting module 280, a report is generated indicating that the result is unknown, or it can be repeated to see if this particular result is anomalous, perhaps caused by a sporadic noise source.

Next, it is determine whether the noise change N1/N2 is significant. The noise change is significant if it crosses some threshold. This threshold can roughly be set to the noise change that the least harmful unfiltered device will impose, while also limiting the probability that the noise change would be significant if there were no unfiltered device present. The following outcomes can be observed and reported with the cooperation of the reporting module 280 to the user:

i) If the noise change on monitoring subcarriers significant, then a harmful unfiltered may be present on the line. In this case, this result can be reported with all remaining operational steps skipped.

ii) If the noise change on monitoring subcarriers is not significant, then it is unlikely that a harmful unfiltered device is present on the line. In this case, report this result and skip all remaining operational steps.

Second Link Process

This second link process is executed only if data set Link1 was able to be collected, but no others were able to be collected. Furthermore, at least one additional PSD profile was used, but the SNR and transmit signal information could not be collected for any PSD profiles except that corresponding to Link1.

A primary cause of link failure is insufficient SNR across the utilized subcarriers. Assume that this is the reason why SNR and transmit signal information could not be collected for any PSD profiles except that corresponding to Link1. For all practical purposes, this places an upper-bound on the SNR that is present across the monitoring subcarriers. This upper bound can easily be determined. Let this SNR upper-bound be denoted as SNRb. Furthermore, the known PSD profiles can be used to estimate the minimum Sb, which can be used to determine the upper-bound of the noise change N1/Nb= (S1*SNRb)/(Sb*SNR1) across the monitoring subcarriers. (Note that the minimum Sb cannot be known exactly in some cases if fine gains are applied by the modems independently and not observable, but in these cases it may be sufficient to neglect fine gains.)

The processor 270 and memory 260 determine whether the upper bound on noise change N1/Nb is reasonable. In this case, a noise change is reasonable if it is expected to be similar to or smaller than the upper bound, but it is observed to be significantly larger.

If the noise change bound across the monitoring subcarriers is not reasonable, then something must have gone wrong with the experiment. In this case, the additional steps below are not performed. The process can then terminate and report that the result is unknown, or it can be repeated to see if this particular result is anomalous, perhaps caused by a sporadic noise source.

Next, it is determined whether the upper bound on noise change N1/Nb is significant, as defined above. The following outcomes can be observed and reported to the user:

i) If the noise change on monitoring subcarriers is significant, then a harmful unfiltered device may be present on the line. In this case, a report and/or instructions are generated with operation ending.

ii) If the noise change on monitoring subcarriers is not significant, then it is unlikely that a harmful unfiltered device is present on the line. In this case, this result can be reported with all remaining processed skipped.

Not all steps above are necessary for the exemplary operation to detect unfiltered devices because portions may be executed independently to better estimate whether an unfiltered device is present on the loop.

For all of the links mentioned above, data already available from previous links may be utilized instead of re-initiating a new link as long as it is known that line conditions (e.g., channel attenuation, background noise, link settings other than PSD profile, etc.) have not changed substantially between the links being compared.

Note that in all of the cases above, additional links may be established (repeat steps above, comparing all links to one another) to gain confidence that a harmful unfiltered device is or is not present on the line.

Each time that the steps described above are exercised, the presence of harmful unfiltered devices can be detected. If the presence of a harmful unfiltered device is detected, it cannot be determined (using only the above steps) exactly how many harmful unfiltered devices are present. To accomplish this, the user is instructed to first locate and remove or filter at least one harmful unfiltered device, and then the above steps repeated. This process can be iterated until there are no more harmful unfiltered devices detected. This iterative process allows the user to determine how many harmful unfiltered devices are present on the twisted-pair line.

In the steps given above, it is not explicitly stated what PSD profiles or which monitoring subcarriers to use. This is because there are numerous types of modem combinations that operate in numerous service areas under different noise conditions in the presence of different unfiltered devices. There is no one best set of PSD profiles or monitoring subcarriers that can be used. They must be chosen on a case-by-case basis. The best PSD profiles and monitoring subcarriers for a given type of situation can be determined prior to fielding the system and stored in lookup tables, or it can be computed dynamically as the conditions are discovered. In general, PSD profiles and monitoring subcarriers are best chosen to satisfy at least three guidelines:

If comparing two successful links, the PSD profiles and monitoring subcarriers should be chosen to maximize the change in noise on the monitoring tones between the two links that is attributable to the inclusion of harmful unfiltered devices. In other words, if there is no harmful unfiltered device, then the change in noise should be minimized; but if there is a harmful unfiltered device, then the change in noise should be maximized. If care is not taken to minimize the change in noise when there is no unfiltered device, then false positives may result. If care is not taken to maximize the change in noise when there is an unfiltered device, then false negatives may result.

If the monitoring subcarriers cannot be observed when a link fails, then the PSD profiles should be chosen to be sufficiently robust so that a link can be established. A link is more robust if it generally results in a higher probability that the link can be established. For example, the inclusion of more subcarriers or higher transmit power levels can make a PSD profile more robust. Similarly, subcarrier masks can be arranged to make a PSD profile more robust against unfiltered nonlinear devices.

For all links initiated, link settings usually should be set to maximize the probability that relevant data can be collected. For example, because it may not be necessary to remain in Showtime for any extended period of time, the required SNR margin often can be set very low. Similarly, one should not set a minimum data rate requirement beyond any imposed by the standard or modem implementations. By allowing links to occur with fewer constraints, the system can potentially link and acquire data on more "difficult" lines (e.g., longer lines and/or lines that contain high noise).

A confidence metric can be also formulated that quantifies the extent to which it is known that an unfiltered device is present on the line. This can be formulated in terms of a probability given the information that is known, or some other metric that is informative to the user.

If one or more harmful unfiltered devices are detected, a data rate impact estimate can be made to determine the effect that the devices are having on the data rates (upstream and downstream) compared with the hypothetical situation in which the devices were to be removed.

Certain exemplary advantages are achieved through this process:
1. The exemplary process can utilize standard compliant data collection and initialization procedures. This includes the data collection and initialization procedures specified ITU and ANSI DSL standards, such as G.992.1/.3/.5 and G.993.2. Because it is possible (although not necessary) to utilize standard-compliant DSL links to acquire the data rather than relying on a proprietary implementation that might not be implemented on some modems, more modems can utilize the exemplary method because the vast majority of DSL modems are effectively standard compliant.
2. The exemplary process can utilize standard compliant sending of data from the far-end modem to the central office, which enables data collection to be initiated and results made available remotely (e.g., from a central office far from the CPE modem and unfiltered devices) without requiring a communication channel other than the DSL link itself used to perform the measurement.

Figure 2:
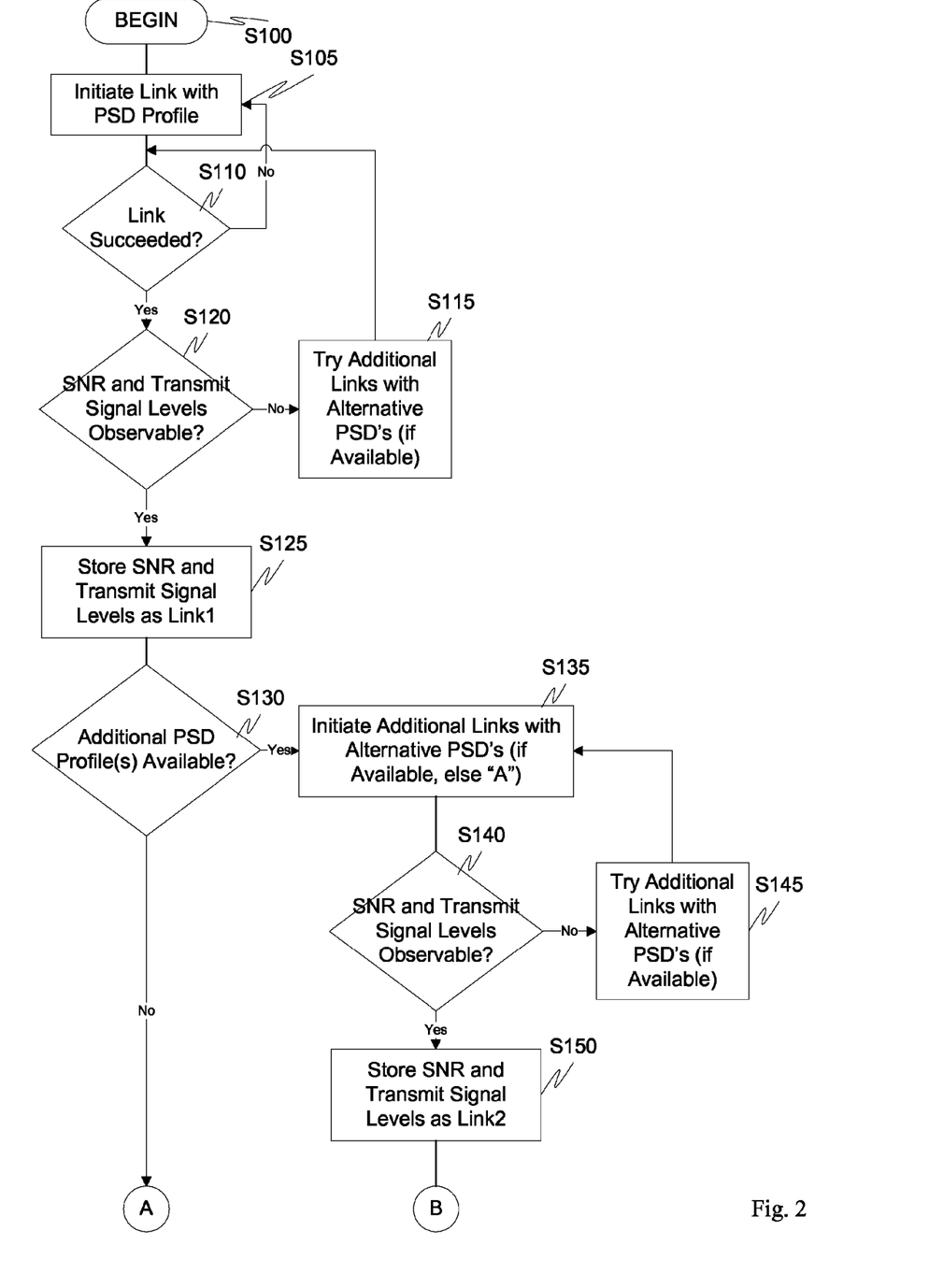
FIGS. 2-3 are a flowchart outlining an exemplary method for unfiltered device detection according this invention.
Figure 3:
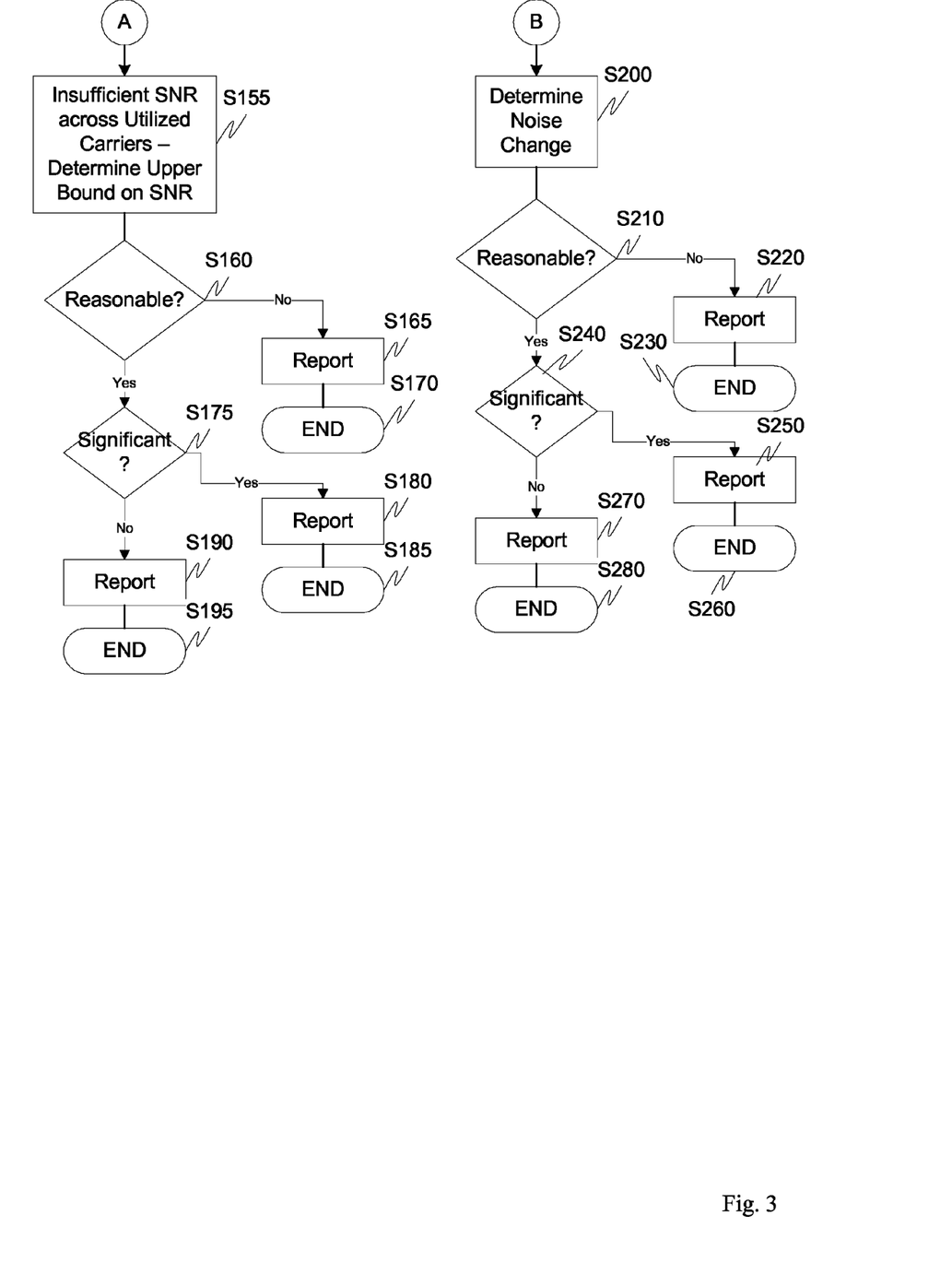

An exemplary method of detecting unfiltered devices will be described in relation to FIGS. 2-3.

Control begins in step S100 with control continuing to step S105. In step S105, a link with a particular PSD profile is initiated. Next, a determination is made whether the link succeeded. If the link succeeded, control continues to step S120. Otherwise, control jumps back to step S105. Next, if the SNR and transmit signal levels are observable only when a link is successful, then it is noted that random environmental fluctuations (such as crosstalk, AM radio interference, etc.) may cause links to fail, so it may be necessary to repeat the link attempt using the same PSD profile if the link fails.

If SNR and transmit signal levels can be observed in step S120 for each of the monitoring subcarriers for the link attempt in the previous step, then control continues to step S125.

In step S115, and if the SNR and transmit signal levels cannot be observed for each of the monitoring subcarriers for the link attempt in the previous step, then additional links may be attempted with alternative PSD profiles. Generally these alternative PSD profiles should be more robust (as discussed later) against noise and/or unfiltered devices so that at least some information can be garnered. If alternate PSD profiles are available, control continues back to step S110 using an alternate PSD profile.

In step S115, and if no other PSD profiles are available, then it cannot be known whether a harmful unfiltered device is present. It may be the case that a harmful unfiltered device is present and is preventing all PSD profiles from linking, or it may be the case that some other type of impairment is present and is preventing all PSD profiles from linking. In this case, a report can be generated that it is unknown whether an unfiltered device is present and the process ends.

In step S125, the signal-to-noise ratios SNR1 and transmit signal levels S1 for each of the monitoring subcarriers for the link established in the first step are stored as Link1. If the link is successful, this usually will be possible. If the link fails, it sometimes might still be possible if special access is available to the information. Additionally, if it is possible to determine the approximate line conditions from the available data (e.g., attenuation, loop length, noise levels), then those can optionally also be recorded and stored to better guide the following steps.

Then, in step S130, a determination is made whether additional PSD profiles are available. If additional PSD profiles are available, control continues to step S135. Otherwise, control jumps to step S155.

In step S135, another link is initiated with a different PSD profile. The monitoring subcarriers used for Link1 should be included in this link attempt. All controllable link parameters except for those controlling the PSD profile should be set exactly the same for this link attempt as for Link1. If line conditions were recorded from Link1, then they can be used to help guide the choice of which PSD profile and monitoring subcarriers to choose for this link attempt. As in step S110, the process waits for this link attempt to succeed or fail. Also, again, to guard against random environmental fluctuations, it may be necessary to repeat this link attempt with the same PSD profile if the SNR and transmit signal levels are not observable upon failure. Control then continues to step S140.

In step S140, if either SNR or transmit signal levels can be observed for each of the monitoring subcarriers for the link attempt in the previous step, control jumps to step S150. Otherwise control continues to step S145.

In step S145, if SNR and transmit signal levels cannot be observed for each of the monitoring subcarriers for the link attempt in the previous step, then additional links may be attempted with alternative PSD profiles. Again, generally these alternative PSD profiles should be more robust against noise and/or unfiltered devices. If no other PSD profiles are available, control jumps to step S155 with control otherwise returning to step S135 where an alternate PSD profile is used.

In step S150, the signal-to-noise ratios SNR2 and transmit signal levels S2 are stored for each of the monitoring subcarriers for the link established in step S135. If the link is successful, this usually will be possible. If the link fails, it sometimes might still be possible if special access is available to the information.

Next, in step S200, the noise change N1/N2=(S1*SNR2)/(S2*SNR1) across the monitoring subcarriers is determined. (Note that in some cases S1 will be the same as S2, which means that the reciprocal ratio of the SNRs can be used directly.) Then, in step S210 it is determined whether the noise change N1/N2 is reasonable. A noise change is reasonable if one of the noises is expected to be similar or significantly larger than the other, but it is observed to be significantly smaller.

If the noise change across the monitoring subcarriers is not reasonable, control continues to step S220 in that something must have gone wrong with the experiment. In this case, a report is generated in step S220 indicating that the result is unknown. Optionally, the test can be repeated to see if this particular result is anomalous, perhaps caused by a sporadic noise source with control continuing to step S230 where the control sequence ends.

If the noise change is reasonable, control continues to step S240 where it is determined whether the noise change N1/N2 is significant. The noise change is significant with control passing to step S250 if the noise crosses a threshold. This threshold can roughly be set to the noise change that the least harmful unfiltered device will impose, while also limiting the probability that the noise change would be significant if there were no unfiltered device present. The following outcomes can be observed and reported to the user:
i) If the noise change on monitoring subcarriers is significant, then a harmful unfiltered may be present on the line. In this case, this can be reported and/or instructions generated with control ending (steps S250 and S260)

ii) If the noise change on monitoring subcarriers is not significant, then it is unlikely that a harmful unfiltered device is present on the line and this can be reported with control ending. (Steps S270 and S280)

Step S155 is performed only if data set Link1 was able to be collected, but no others were able to be collected. Furthermore, at least one additional PSD profile was used, but the SNR and transmit signal information could not be collected for any PSD profiles except that corresponding to Link1.

A primary cause of link failure is insufficient SNR across the utilized subcarriers. One can assume that this is the reason why SNR and transmit signal information could not be collected for any PSD profiles except that corresponding to Link1. As discussed, for all practical purposes, this places an upper-bound on the SNR that is present across the monitoring subcarriers. This upper bound can easily be determined as outlined above.

IN step S160, a determination is made whether the upper bound on noise change N1/Nb is reasonable. In this case, a noise change is reasonable if it is expected to be similar to or smaller than the upper bound, but it is observed to be significantly larger with control continuing to step S175.

If the noise change bound across the monitoring subcarriers is not reasonable, then something must have gone wrong with the experiment and control continues to step S165. In this case, the exemplary method can terminate and report that the result is unknown, or it can be repeated to see if this particular result is anomalous, perhaps caused by a sporadic noise source. (Steps S165 and S170)

If the upper bound is reasonable, control continues to step S175. In step S175, a determination is made whether the upper bound on noise change N1/Nb is significant, as defined above. The following outcomes can be observed and reported to the user:

i) If the noise change on monitoring subcarriers is significant, then a harmful unfiltered device may be present on the line. In this case, a report and/or instructions can be generated with control continuing to step S185 where the control sequence ends.

ii) If the noise change on monitoring subcarriers is not significant, then it is unlikely that a harmful unfiltered device is present on the line. In this case, a report and/or instructions can be generated with control continuing to step S195 where the control sequence ends.

Figure 4:
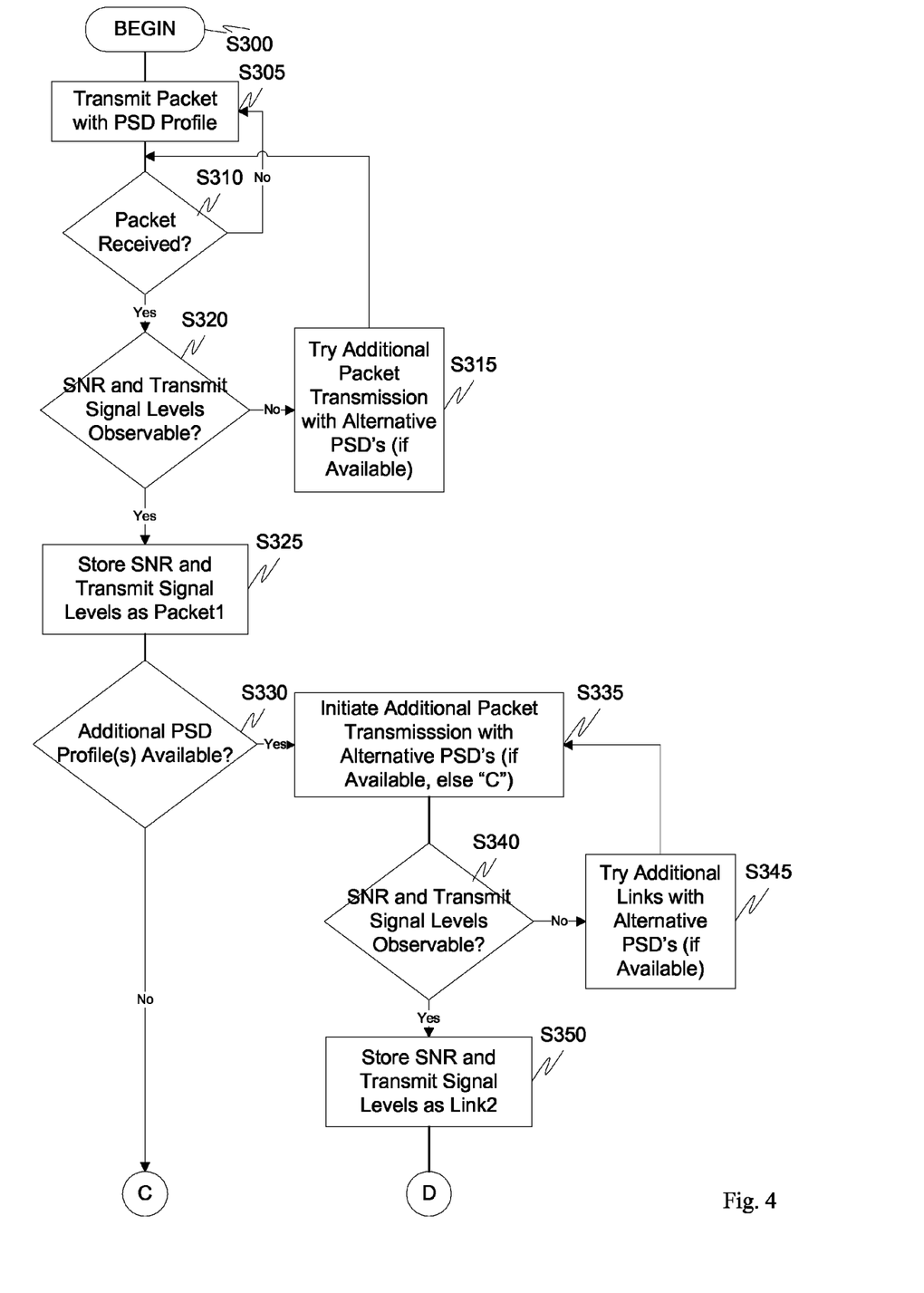
FIGS. 4-5 are a flowchart outlining an exemplary method for unfiltered device detection in a packet-based network according this invention.
Figure 5:
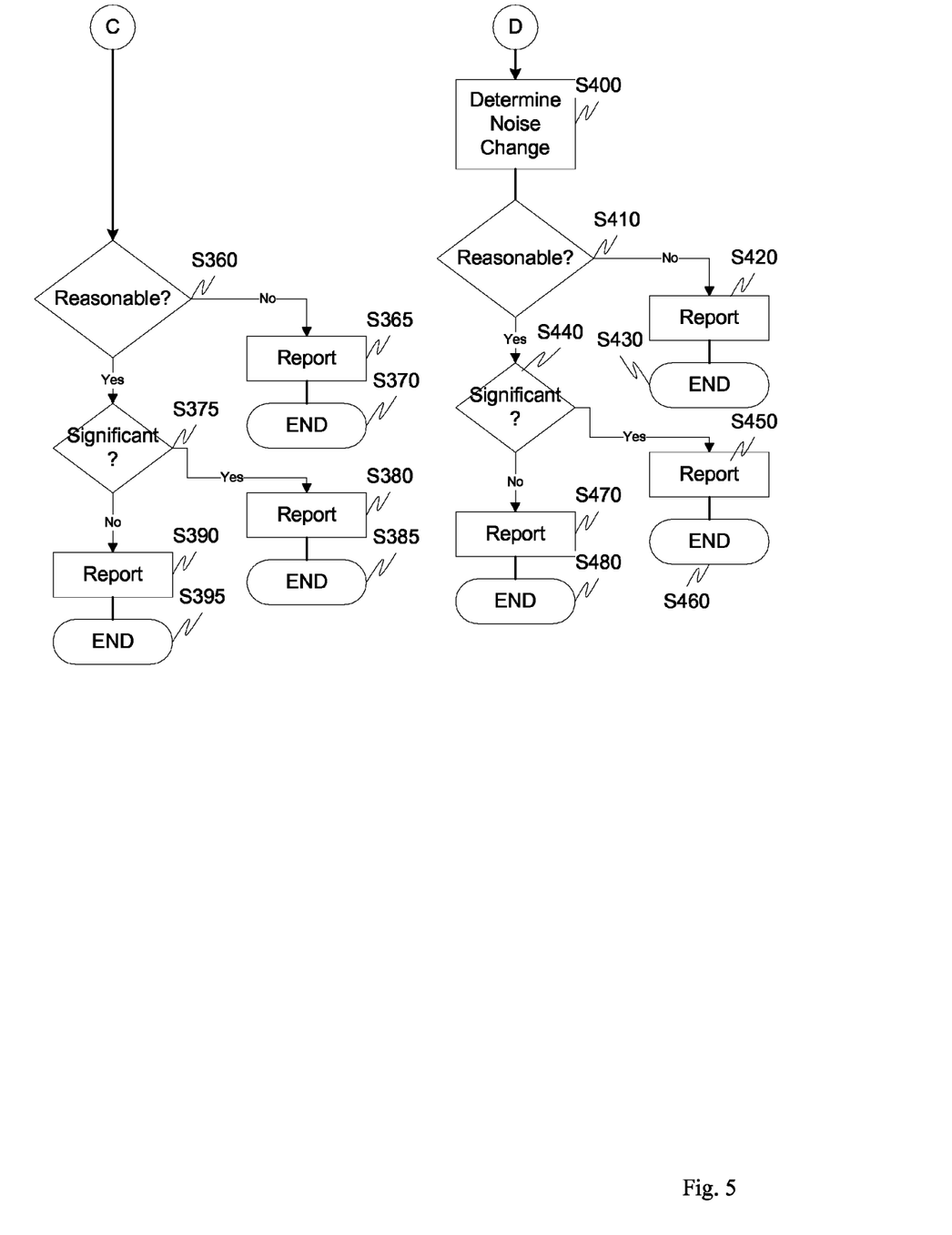

An exemplary method of detecting unfiltered devices in packet-based networks will be described in relation to FIGS. 4-5. In that the process for detecting unfiltered devices in a packet-based environment is similar to the above described embodiment, the communications system 100 will not be re-described. It is to be appreciated however, that the general functionality described above as to the operation of the components/modules illustrated in FIG. 1 can be applied to packet-based network embodiment described below.

Specifically, control begins in step S300 with control continuing to step S305. In step S305, a packet is transmitted with a particular PSD profile. Next, a determination is made whether the packet was received successfully. If the packet was received successfully, control continues to step S320. Otherwise, control jumps back to step S305. Next, if the SNR and transmit signal levels are observable only when a packet reception is successful, then it is noted that random environmental fluctuations (such as crosstalk, AM radio interference, etc.) may cause packet reception to fail, so it may be necessary to repeat the packet transmission attempt using the same PSD profile if the packet reception fails.

If SNR and transmit signal levels can be observed in step S320 for each of the monitoring one or more subcarriers for the packet transmission attempt in the previous step, then control continues to step S325.

In step S315, and if the SNR and transmit signal levels cannot be observed for each of the monitoring subcarriers for the packet transmission attempt in the previous step, then additional packet transmissions may be attempted with alternative PSD profiles. Generally these alternative PSD profiles should be more robust (as discussed later) against noise and/or unfiltered devices so that at least some information can be garnered. If alternate PSD profiles are available, control continues back to step S310 using an alternate PSD profile.

In step S315, and if no other PSD profiles are available, then it cannot be known whether a harmful unfiltered device is present. It may be the case that a harmful unfiltered device is present and is preventing all PSD profiles from packet reception, or it may be the case that some other type of impairment is present and is preventing all PSD profiles from successful packet reception. In this case, a report can be generated that it is unknown whether an unfiltered device is present and the process ends.

In step S325, the signal-to-noise ratios SNR1 and transmit signal levels S1 for each of the monitoring subcarriers for the first packet transmission are established in the first step are stored as Packet1. Additionally, if it is possible to determine the approximate line conditions from the available data (e.g., attenuation, loop length, noise levels), then those can optionally also be recorded and stored to better guide the following steps.

Then, in step S330, a determination is made whether additional PSD profiles are available. If additional PSD profiles are available, control continues to step S335. Otherwise, control jumps to step S360.

In step S335, another packet transmission is initiated with a different PSD profile. The monitoring subcarriers used for Packet1 should be included in this packet transmission attempt. All controllable packet transmission parameters except for those controlling the PSD profile should be set exactly the same for this packet transmission attempt as for Packet1. If line conditions were recorded from Packet1, then they can be used to help guide the choice of which PSD profile and monitoring subcarriers to choose for this packet transmission attempt. As in step S310, the process waits for this Packet reception attempt to succeed or fail. Also, again, to guard against random environmental fluctuations, it may be necessary to repeat this packet transmission attempt with the same PSD profile if the SNR and transmit signal levels are not observable upon failure. Control then continues to step S340.

In step S340, if either SNR or transmit signal levels can be observed for each of the monitoring subcarriers for the packet transmission attempt in the previous step, control jumps to step S350. Otherwise control continues to step S345.

In step S345, if SNR and transmit signal levels cannot be observed for each of the monitoring subcarriers for the packet reception attempt in the previous step, then additional packet transmission may be attempted with alternative PSD profiles. Again, generally these alternative PSD profiles should be more robust against noise and/or unfiltered devices. If no other PSD profiles are available, control jumps to step S360 with control otherwise returning to step S335 where an alternate PSD profile is used.

In step S350, the signal-to-noise ratios SNR2 and transmit signal levels S2 are stored for each of the monitoring subcarriers for the packet transmission established in step S335.

Next, in step S400, the noise change $N1/N2=(S1*SNR2)/(S2*SNR1)$ across the monitoring subcarriers is determined.

(Note that in some cases S1 will be the same as S2, which means that the reciprocal ratio of the SNRs can be used directly.) Then, in step S410 it is determined whether the noise change N1/N2 is reasonable. A noise change is reasonable if one of the noises is expected to be similar or significantly larger than the other, but it is observed to be significantly smaller.

If the noise change across the monitoring subcarriers is not reasonable, control continues to step S420 in that something must have gone wrong with the experiment. In this case, a report is generated in step S420 indicating that the result is unknown. Optionally, the test can be repeated to see if this particular result is anomalous, perhaps caused by a sporadic noise source with control continuing to step S430 where the control sequence ends.

If the noise change is reasonable, control continues to step S440 where it is determined whether the noise change N1/N2 is significant. The noise change is significant with control passing to step S450 if the noise crosses a threshold. This threshold can roughly be set to the noise change that the least harmful unfiltered device will impose, while also limiting the probability that the noise change would be significant if there were no unfiltered device present. The following outcomes can be observed and reported to the user:

i) If the noise change on monitoring subcarriers is significant, then a harmful unfiltered may be present on the line. In this case, this can be reported and/or instructions generated with control ending (steps S450 and S460)

ii) If the noise change on monitoring subcarriers is not significant, then it is unlikely that a harmful unfiltered device is present on the line and this can be reported with control ending. (Steps S470 and S480)

In step S360, a determination is made whether the upper bound on noise change N1/Nb is reasonable. In this case, a noise change is reasonable if it is expected to be similar to or smaller than the upper bound, but it is observed to be significantly larger with control continuing to step S375.

If the noise change bound across the monitoring subcarriers is not reasonable, then something must have gone wrong with the experiment and control continues to step S365. In this case, the exemplary method can terminate and report that the result is unknown, or it can be repeated to see if this particular result is anomalous, perhaps caused by a sporadic noise source. (Steps S365 and S370)

If the upper bound is reasonable, control continues to step S375. In step S375, a determination is made whether the upper bound on noise change N1/Nb is significant, as defined above. The following outcomes can be observed and reported to the user:

i) If the noise change on monitoring subcarriers is significant, then a harmful unfiltered device may be present on the line. In this case, a report and/or instructions can be generated with control continuing to step S385 where the control sequence ends.

ii) If the noise change on monitoring subcarriers is not significant, then it is unlikely that a harmful unfiltered device is present on the line. In this case, a report and/or instructions can be generated with control continuing to step S395 where the control sequence ends.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments, but rather the steps can be performed by one or the other transceiver in the communication system. Additionally, the exemplary techniques illustrated herein are not limited to the specifically illustrated embodiments but can also be utilized with the other exemplary embodiments and each described feature is individually and separately claimable.

The above-described methods and systems and can be implemented in a software module, a software and/or hardware testing module, a telecommunications test device, a DSL modem, an ADSL modem, an xDSL modem, a VDSL modem, a G.hn transceiver, a linecard, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software, which can be stored on a computer-readable storage medium, and executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a testing module or device.

While the invention is described in terms of exemplary embodiments, it should be appreciated that individual aspects of the invention could be separately claimed and one or more of the features of the various embodiments can be combined.

It is therefore apparent that there has been provided, in accordance with the present invention, systems and methods for detecting unfiltered device(s). While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A module, including a processor, capable of detecting the presence of a nonlinear device by comparing at least one first parameter value to at least one second parameter value, wherein the first parameter value is from a first link having a first transmit power level and the second parameter value is from a second link having a second different transmit power level, wherein the first link is initiated with a particular PSD (Power Spectral Density) profile, and a determination is made as to whether the first link with the particular PSD profile succeeds or fails, and when the first link fails, an alternative PSD that is more robust against noise is used.

2. A method of detecting the presence of a nonlinear device comprising:

comparing, using a processor, at least one first parameter value to at least one second parameter value, wherein the first parameter value is from a first link having a first transmit power level and the second parameter value is from a second link having a second different transmit power level, wherein the first link is initiated with a particular PSD (Power Spectral Density) profile, and a determination is made as to whether the first link with the particular PSD profile succeeds or fails, and when the first link fails, an alternative PSD that is more robust against noise is used.

3. A non-transitory computer-readable information storage media having stored thereon instructions, that when executed by a processor, cause to be performed a method comprising: comparing at least one first parameter value to at least one second parameter value, wherein the first parameter value is from a first link having a first transmit power level and the second parameter value is from a second link having a second different transmit power level, wherein the first link is initiated with a particular PSD (Power Spectral Density) profile, and a determination is made as to whether the first link with the particular PSD profile succeeds or fails, and when the first link fails, an alternative PSD that is more robust against noise is used.

4. The module of claim 1, wherein the first transmit power level is for at least one subcarrier in the first link and the second transmit power level is different, and for the at least one subcarrier in the second link.

5. The module of claim 1, wherein the first parameter value corresponds to at least one of a noise measurement or an SNR measurement on at least one subcarrier.

6. The module of claim 1, wherein the second parameter value corresponds to at least one of a noise measurement or an SNR measurement on at least one subcarrier.

7. The module of claim 1, wherein the first parameter value and the second parameter value correspond to at least one of a noise measurement or an SNR measurement on at least one subcarrier.

8. The module of claim 1, wherein a user is notified of the detection of a non-linear device.

9. The module of claim 1, wherein additional links are performed to identify additional non-linear devices.

10. The module of claim 1, wherein link is a process of initializing two transceivers and entering into a steady state data transmission mode.

11. The method of claim 2, wherein the first transmit power level is for at least one subcarrier in the first link and the second transmit power level is different, and for the at least one subcarrier in the second link.

12. The method of claim 2, wherein the first parameter value corresponds to at least one of a noise measurement or an SNR measurement on at least one subcarrier.

13. The method of claim 2, wherein the second parameter value corresponds to at least one of a noise measurement or an SNR measurement on at least one subcarrier.

14. The method of claim 2, wherein the first parameter value and the second parameter value correspond to at least one of a noise measurement or an SNR measurement on at least one subcarrier.

15. The method of claim 2, wherein a user is notified of the detection of a non-linear device.

16. The method of claim 2, wherein additional links are performed to identify additional non-linear devices.

17. The method of claim 2, wherein link is a process of initializing two transceivers and entering into a steady state data transmission mode.

18. The media of claim 3, wherein the first transmit power level is for at least one subcarrier in the first link and the second transmit power level is different, and for the at least one subcarrier in the second link.

19. The media of claim 3, wherein the first parameter value corresponds to at least one of a noise measurement or an SNR measurement on at least one subcarrier.

20. The media of claim 3, wherein the second parameter value corresponds to at least one of a noise measurement or an SNR measurement on at least one subcarrier.

21. The media of claim 3, wherein the first parameter value and the second parameter value correspond to at least one of a noise measurement or an SNR measurement on at least one subcarrier.

22. The media of claim 3, wherein a user is notified of the detection of a non-linear device.

23. The media of claim 3, wherein additional links are performed to identify additional non-linear devices.

24. The media of claim 3, wherein link is a process of initializing two transceivers and entering into a steady state data transmission mode.

* * * * *